United States Patent
Joung et al.

(10) Patent No.: US 9,625,289 B2
(45) Date of Patent: Apr. 18, 2017

(54) CALIBRATION METHOD OF MODULATION POWER FOR DVB-H TEST APPARATUS

(75) Inventors: Jinsoup Joung, Seongnam-si (KR);
Jongmin Kim, Seongnam-si (KR);
Changbok Yang, Seongnam-si (KR);
Myunggu Kang, Suwon-si (KR)

(73) Assignee: INNOWIRELESS CO., LTD., Seongnam-si (KR)

( * ) Notice: Subject to any disclaimer, the term of this patent is extended or adjusted under 35 U.S.C. 154(b) by 891 days.

(21) Appl. No.: 13/822,436

(22) PCT Filed: Jan. 6, 2011

(86) PCT No.: PCT/KR2011/000078
§ 371 (c)(1),
(2), (4) Date: Mar. 12, 2013

(87) PCT Pub. No.: WO2012/036353
PCT Pub. Date: Mar. 22, 2012

(65) Prior Publication Data
US 2013/0173195 A1    Jul. 4, 2013

(30) Foreign Application Priority Data
Sep. 14, 2010   (KR) .................... 10-2010-0089754

(51) Int. Cl.
*G01D 18/00*   (2006.01)
*H04B 17/13*   (2015.01)

(52) U.S. Cl.
CPC ........... *G01D 18/002* (2013.01); *H04B 17/13* (2015.01)

(58) Field of Classification Search
CPC ........ G01D 18/00; G01D 18/02; G01D 18/04; G01D 18/06; G01D 18/08; G01D 21/00; H04B 17/13

(Continued)

(56) References Cited

U.S. PATENT DOCUMENTS

2006/0005065 A1   1/2006   Nakayama et al.
2007/0007942 A1   1/2007   King et al.
(Continued)

FOREIGN PATENT DOCUMENTS

| JP | 2008232809 | 10/2008 |
| JP | 2009103707 | 5/2009 |
| KR | 1020060091967 | 8/2003 |

OTHER PUBLICATIONS

Korean Notice of Allowance—Korean Application No. 10-2010-0089754 issued on Oct. 24, 2011, citing JP2009103707, JP2008232809, US20070007942 and US20100141238.

*Primary Examiner* — Gregory J Toatley
*Assistant Examiner* — Eman Alkafawi
(74) *Attorney, Agent, or Firm* — Cantor Colburn LLP

(57) ABSTRACT

This invention relates to a calibration method of modulation power for DVB-H test apparatus for reducing the calibration time for the power loss in the RF cable to half through calibration using the expected power loss of the modulated wave at an arbitrary frequency based on the measured power losses of the continuous wave over frequencies in the RF cable. The calibration method of modulation power for DVB-H test apparatus that is performed by the computer with installed calibration program therein and connected to the power meter of the DVB-H test apparatus, comprises and includes the steps of: commanding DVB-H test apparatus to output continuous waves having frequencies from the start frequency to the stop frequency with increment of frequency step in accordance with the preset power level; storing CW power offset, that is the difference between the actual power level and the preset power level, to the table after receiving actual power level of continuous waves having frequencies from the start frequency to the stop frequency with increment of frequency step from the power meter; commanding DVB-H test apparatus to output a modulated wave that (Continued)

carries data on a continuous wave having an arbitrary frequency between the start frequency and the stop frequency, thereafter receiving actual output power level from the power meter, and calculating the modulation power offset between the continuous wave and the modulated wave at the corresponding arbitrary frequency, thereafter commanding DVB-H test apparatus to output the preset power level added with the power offset of the continuous wave and the power offset of the modulated wave when transmitting the modulated wave.

2 Claims, 3 Drawing Sheets

(58) Field of Classification Search
USPC .................................... 702/85, 120, 87, 86
See application file for complete search history.

(56) References Cited

U.S. PATENT DOCUMENTS

| 2007/0066271 | A1* | 3/2007 | Vavelidis | ............. | H04B 1/0064 |
| | | | | | 455/333 |
| 2010/0141238 | A1 | 6/2010 | Bradley | | |
| 2012/0259571 | A1* | 10/2012 | Kang | ..................... | H04B 17/21 |
| | | | | | 702/85 |

* cited by examiner

CALIBRATION METHOD OF MODULATION POWER FOR DVB-H TEST APPARATUS

TECHNICAL FIELD

This invention relates to a calibration method of modulation power for DVB-H test apparatus and, more particularly, to a calibration method of modulation power for DVB-H test apparatus for reducing the calibration time for the power loss in the RF cable to half through calibration using the expected power loss of the modulated wave at an arbitrary frequency based on the measured power losses of the continuous wave (CW) over frequencies in the RF cable.

BACKGROUND ART

Digital Video Broadcasting-Handheld (referred to as 'DVB-H' hereinafter), one of the digital broadcasting specifications for the mobile TV, is a technical specification specifying the broadcasting service specifications for the mobile handsets.

DVB-H specifies additional requirements for the handheld devices in Digital Video Broadcasting Terrestrial (referred to as 'DVB-T' hereinafter) which is a specifications for digital terrestrial mobile broadcasting. DVB-H was formally adopted as European standard in 2004, and details are specified in ESTI EN 302 304. In 2008, DVB-H was officially endorsed by the European Union as the preferred technology for terrestrial mobile broadcasting. Meanwhile, DVB-SH (Satellite to Handhelds) and DVB-NGH (Next Generation Handheld) are considered for possible enhancements to DVB-H, providing improved spectral efficiency and better modulation flexibility.

In general, test or measurement devices of the communication system should suffice various requirements according to the testing purpose of the user. As communication systems are tend to be more complex and advanced, performance test equipments for such systems are required to perform accurate and reliable performance testing and have measurement functions for the various test items for the communication systems.

Besides, to have more reliable test results for the various test items, same characteristics must be maintained over the various frequency ranges throughout the test. Although test equipments include various RF characteristics, uniformity of the frequency characteristics can be obtained through the following calibration process. As for the measurement equipment calibration methods, there are frequency calibration, output power level calibration, IQ modulation calibration, and modulated carrier calibration etc. The output power level over the frequency range is a barometer representing the accuracy of a DVB-H system; the reliability of the accuracy of the output power level is obtained when the continuous wave (referred to as 'CW' hereinafter) and the modulated wave that is the CW carrying digital data, are all maintained at the preset power level.

FIG. 1 is a block diagram of a conventional DVB-H test equipment. As shown in FIG. 1, the conventional DVB-H test equipment 100 is comprised of a baseband signal generation unit 110, a carrier generation unit 120, and a test signal modulation unit 130.

In the configuration described above, the baseband signal generation unit 110 is comprised of an I-mode signal generation circuit, a Q-mode signal generation circuit, and a gain control circuit for controlling the gain of the I-mode and Q-mode signals. The carrier generation unit 120 is comprised of a carrier generation circuit and a gain control circuit for controlling the gain of the carrier generation circuit. The test signal modulation unit 130 is comprised of an offset control circuit for the I-mode and Q-mode signals and an IQ modulation circuit. The IQ modulation circuit modulates signals by controlling the amplitude and phase of the two orthogonal signals, I-mode and Q-mode.

Meanwhile, in the DVB-H test equipment 100 as shown in FIG. 1, a RF connector 160 is mounted on the front panel 150, and the output of the test signal modulation unit 130 and the RF connector 160 are connected through the RF cable 140. In a test equipment having such structure, although it is self-calibrated up to the test signal modulation unit 130, the frequency dependent loss occurring in the RF cable 140 must be compensated.

FIG. 2 is a graph showing power loss occurring in the RF cable of the DVB-H test equipment. As shown in FIG. 2, the cable insertion loss increases as the frequency increases; since it is self-calibrated up to the test signal modulation unit 130 as described above, only the power loss occurring in the RF cable 140 between the test signal modulation unit 130 and the front panel 150 needs to be calibrated.

Meanwhile, since the power loss of the RF cable 140 is different between the continuous wave and the data-carrying modulated wave, conventionally the starting frequency, stop frequency, frequency step, and desired power level are preset individually, for example, 100 MHz for the starting frequency and 4 GHz for the stop frequency, 10 MHz for the frequency step and −25 dBm for the desired power level; thereafter the power loss calibration of the RF cable for the continuous wave and the power loss calibration of the RF cable for the modulated wave are performed separately by increasing the frequency with the frequency step, thereby requiring significant amount of time in the calibration process. Moreover, such problems are getting worse as the interval between the start frequency and stop frequency becomes wider and as the frequency step becomes smaller.

DISCLOSURE OF INVENTION

Technical Problem

To overcome the problems described above, the objective of this invention is to provide a calibration method of modulation power for DVB-H test apparatus for reducing the calibration time for the power loss in the RF cable to half through calibration using the expected power loss of the modulated wave over frequency based on the measured power losses of the continuous wave (CW) over frequencies in the RF cable.

Solution to Problem

To achieve the objective described above, a calibration method of modulation power for DVB-H test apparatus that is performed by the computer with installed calibration program therein and connected to the power meter of the DVB-H test apparatus, comprises and includes the steps of:

commanding DVB-H test apparatus to output continuous waves having frequencies from the start frequency to the stop frequency with increment of frequency step in accordance with the preset power level;

storing CW power offset, that is the difference between the actual power level and the preset power level, to the table after receiving actual power level of continuous waves having frequencies from the start frequency to the stop frequency with increment of frequency step from the power meter;

commanding DVB-H test apparatus to output a modulated wave that carries data on a continuous wave having an arbitrary frequency between the start frequency and the stop frequency, thereafter receiving actual output power level from the power meter, and calculating the modulation power offset between the continuous wave and the modulated wave at the corresponding arbitrary frequency, thereafter commanding DVB-H test apparatus to output the preset power level added with the power offset of the continuous wave and the power offset of the modulated wave when transmitting the modulated wave.

Advantageous Effects of Invention

According to the calibration method of modulation power for DVB-H test apparatus of the present invention, the calibration time for the power loss in the RF cable can be reduced to half by measuring power losses of the continuous wave (CW) over frequencies in the RF cable, while measuring power loss of the modulated wave only for one arbitrary frequency; and by enabling calibration using the expected power loss of the modulated wave at the arbitrary frequency based on the previous measurement results and the power losses of the continuous wave over frequencies.

Figure 1:
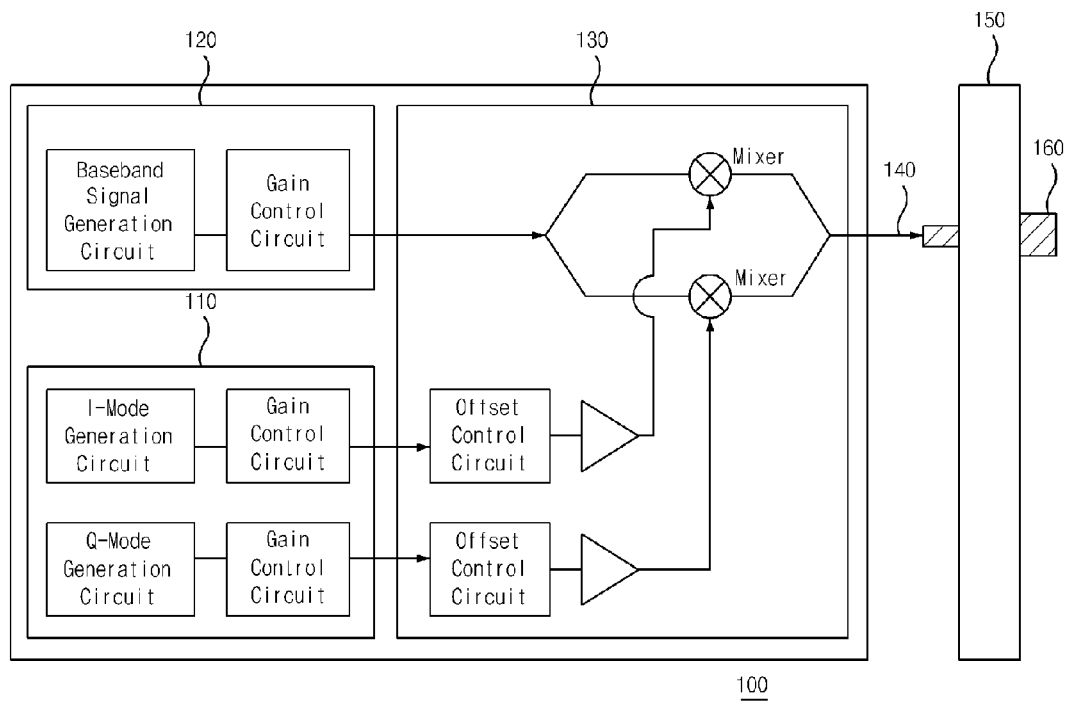
FIG. 1 is a block diagram of a conventional DVB-H test equipment.
Figure 2:
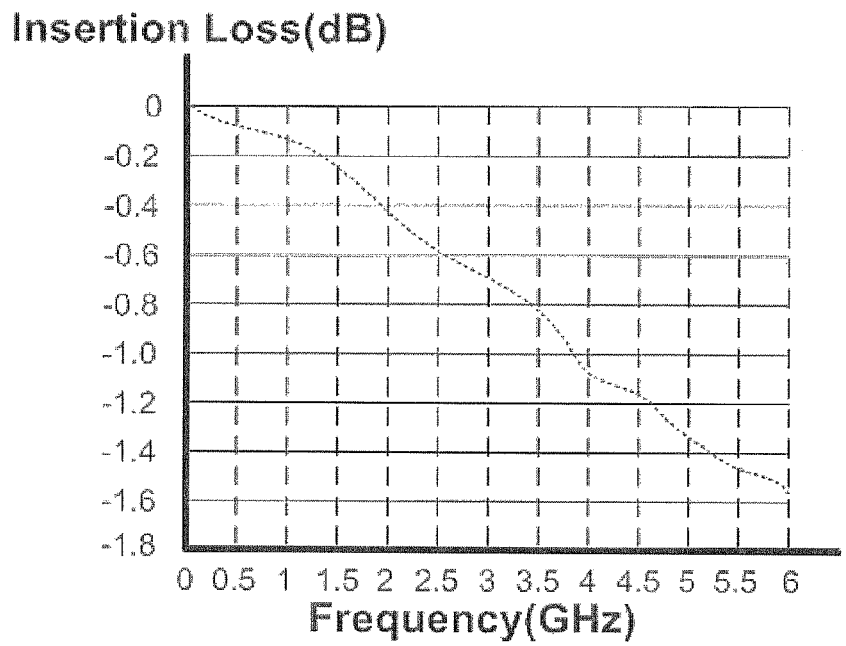
FIG. 2 is a graph showing power loss occurring in the RF cable of the DVB-H test equipment.

DESCRIPTION OF REFERENCE NUMERALS
OF PRINCIPAL ELEMENTS IN THE
DRAWINGS

100: DVB-H test apparatus,
110: baseband signal generation unit,
120: carrier generation unit,
130: test signal modulation unit,
140: RF cable,
150: front panel,
160: RF connector,
200: computer,
300: power meter.

MODE FOR THE INVENTION

Hereinafter an exemplary embodiment according to the calibration method of modulation power for DVB-H test apparatus of the present invention will be described in detail with reference to the accompanying drawings. The method of the invention is based on the ideas that the difference in the power loss between the modulated wave and the continuous wave is caused by the change in the waveform not by the effects from the RF cable or frequency; the method utilizes the fact that after measuring the power losses of the continuous wave (CW) over frequencies in the RF cable, if the power loss of a modulated wave in the RF cable at an arbitrary frequency is measured, then the difference between these power losses at the corresponding frequency becomes the difference in the power loss over whole frequencies between the continuous wave and the modulated wave.

Figure 3:
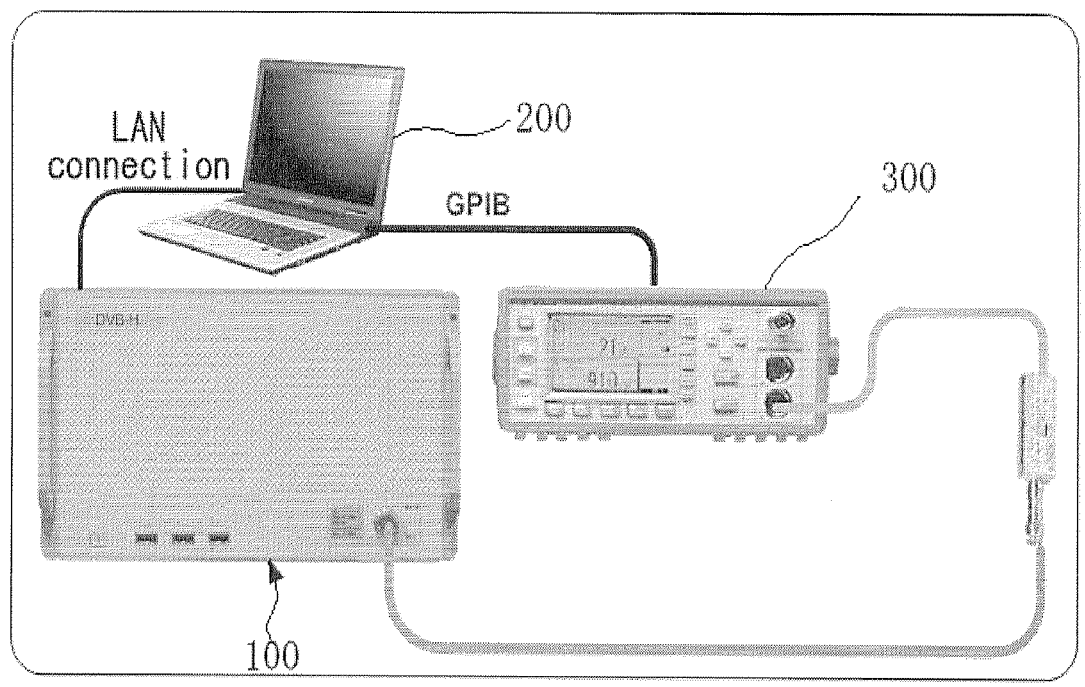
FIG. 3 is an illustration of a calibration system according to the calibration method of modulation power for DVB-H test apparatus of the present invention.

FIG. 3 is an illustration of a calibration system according to the calibration method of modulation power for DVB-H test apparatus of the present invention. As shown in FIG. 3, in order to calibrate a DVB-H test apparatus according to the present invention, it is required to have: a DVB-H test apparatus 100 as shown in FIG. 1; a power meter 300 for measuring and transmitting the output power level of the DVB-H test apparatus 100; and a computer 200 for commanding the DVB-H test apparatus to transmit continuous waves in accordance with the user preset power levels, the frequency range, and the frequency step interval, for commanding to transmit modulated wave of an arbitrary frequency at the user preset power level, and for storing the differences (referred to as 'CW power offset' hereinafter), i.e. calibration data, between the preset power level and the output power level received from the power meter 300 according to the frequency step. To perform the above-described functions, a calibration program must be installed in the computer 200 for receiving the start/stop frequency, the frequency step, and the power rail assigned by the user, for transmitting these data to the DVB-H test apparatus 100, and for automatically establishing the table containing the CW power offset over frequencies, i.e. the calibration data (referred to as 'CW power offset table' hereinafter), after receiving the output power level from the power meter 300.

The difference between the CW and the modulated wave output power level (referred to as 'modulated wave power offset' hereinafter) at the arbitrary frequency is stored in the computer 200; the computer 200 transmits CW offset table and modulated wave power offset data to the DVB-H test apparatus 100; thereafter, when transmitting a CW, the I-mode and Q-mode signal generation circuits in the baseband signal generation unit 110 transmits I-mode and Q-mode signals after increasing their preset power levels by adding the corresponding CW power offset levels at the operating frequency. In a similar manner, when transmitting a modulated wave, the DVB-H test apparatus 100 transmits I-mode and Q-mode signals through the I-mode and Q-mode signal generation circuits in the baseband signal generation unit 110 after increasing their preset power levels by adding the corresponding CW and modulation power offset levels.

In the above-described configuration, the DVB-H test apparatus 100 is connected to the computer 200 through the USB or LAN cable; the DVB-H test apparatus 100 is connected to the power meter through the RF cable; and the power meter 300 is connected to the computer 200 through the general purpose interface bus (GPIB) cable.

Figure 4:
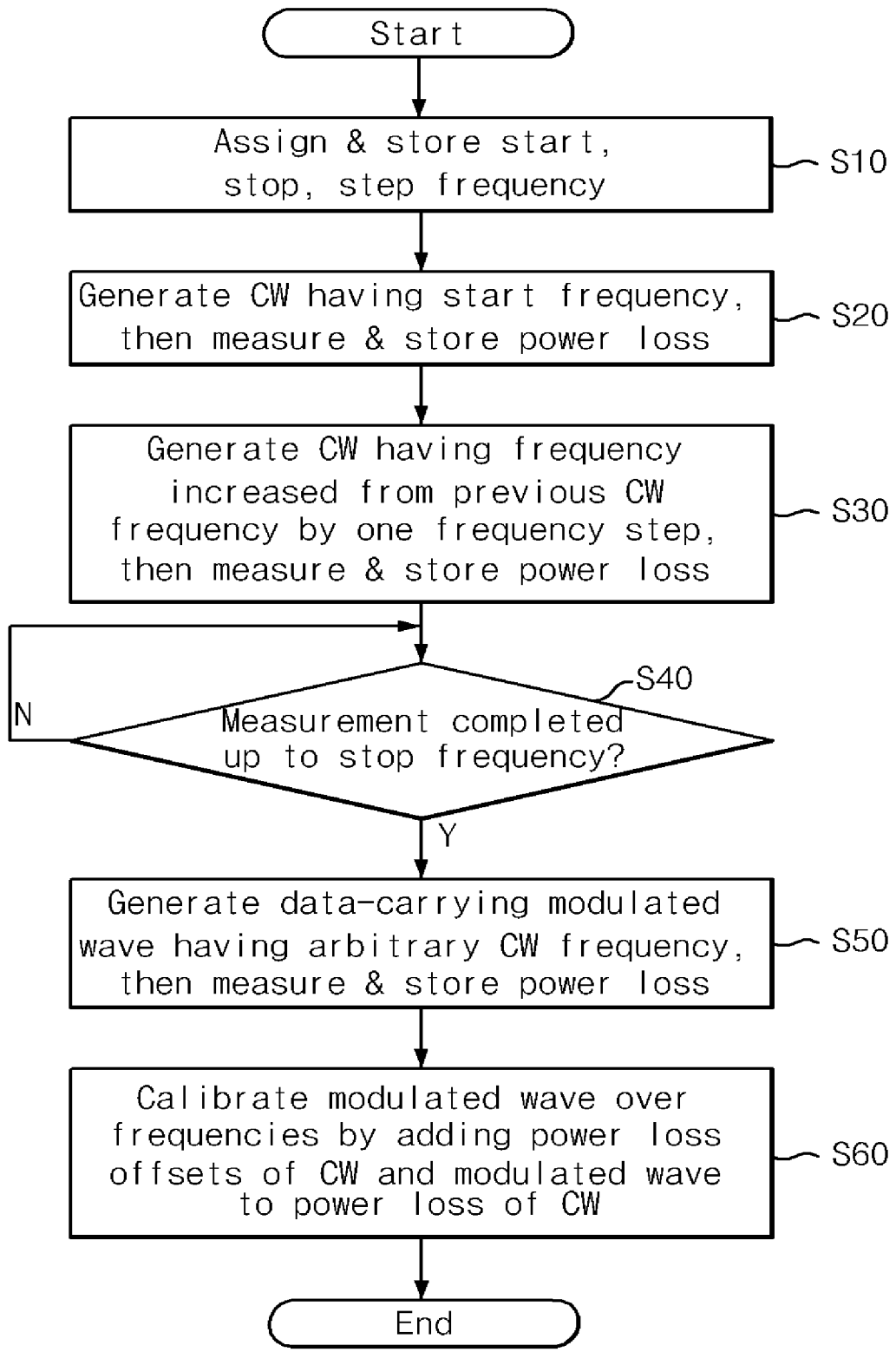
FIG. 4 is a flow diagram describing the calibration method of modulation power for DVB-H test apparatus of the present invention.

FIG. 4 is a flow diagram describing the calibration method of modulation power for DVB-H test apparatus. First, a start frequency, a stop frequency, a frequency step, and a desired output power level are assigned by the user, thereafter this information is transmitted to the DVB-H test apparatus 100 (S10) by the calibration program installed in the computer 200 as shown in FIG. 4.

Next, a CW having start frequency is generated by the DVB-H test apparatus 100, then the actual output power level of the CW is measured by the power meter 300 and transmitted to the computer 200. Then the difference between the preset power level and output power level at the corresponding start frequency, i.e. CW power offset at the start frequency, is stored in the table by the computer 200 (S20); the difference becomes the power loss of the RF cable at the corresponding frequency.

Next, a CW having frequency increased from the previous CW frequency by one frequency step is generated by the DVB-H test apparatus 100, then the actual output power level of the CW is measured by the power meter 300 and transmitted to the computer 200. Then the CW power offset at the corresponding CW frequency is stored in the table by the computer 200 (S30). Such procedure is repeated until the CW frequency reaches to the stop frequency (S30 and S40). Once the power loss of the CW having the stop frequency is stored, the computer 200 instructs the DVB-H test apparatus 100 to generate a data-carrying modulated wave having an arbitrary frequency between the start and stop frequencies; and the power meter 300 transmits actual power level to the computer 200.

Next, the computer 200 calculates and stores the modulation power offset between the CW and the modulated wave at the corresponding arbitrary frequency (S50); thereafter the CW power offset table and the modulation offset data are transmitted to the DVB-H test apparatus 100.

Later, when transmitting the modulated wave over frequencies, the DVB-H test apparatus 100 transmits I-mode and Q-mode signals after increasing their preset power levels by adding the corresponding CW and modulation power offset levels (S60).

The calibration method of modulation power for DVB-H test apparatus of the present invention is not limited by the above-described exemplary embodiments, and various changes and modification may be made thereto, without departing from the scope and spirit of the present invention. For example, unlike the above-described exemplary embodiments, all the modulation power offsets over frequencies can be calculated using CW power offset and provided as a table.

The invention claimed is:

1. A calibration method of modulation power for a DVB-H (Digital Video Broadcasting-Handheld) test apparatus performed by a computer having a calibration program installed therein and connected to a power meter of the DVB-H test apparatus, comprising:
   (a) commanding the DVB-H test apparatus to output continuous waves having frequencies from a start frequency to a stop frequency, wherein each interval between adjacent frequencies is equal to a frequency step, the continuous waves having a preset power level;
   (b) receiving an actual power level of each of the continuous waves from the power meter, obtaining a continuous wave power offset which is a difference between the actual power level and the preset power level, and storing the continuous wave power offset in a power offset table; and
   (c) commanding the DVB-H test apparatus to output modulated waves, each of which carries data on a continuous wave having a frequency within a range from the start frequency to the stop frequency, receiving an actual output power level of each of the modulated waves from the power meter, obtaining the modulation power offset between the continuous wave and the modulated wave at each frequency among the frequencies from the start frequency to the stop frequency, and thereafter commanding the DVB-H test apparatus to output each modulated wave whose power level is equal to a total power level obtained by adding the preset power level, the continuous wave power offset stored in the power offset table and the modulation power offset so as to obtain an expected power loss at a cable for each modulated wave based on an actual power loss at the cable for each continuous wave wherein the cable is connected between the DVB-H test apparatus and an RF (radio frequency) connector.

2. A non-transitory computer readable recording medium having installed a programming that performs the method as set forth in claim 1.

* * * * *